United States Patent
Nagata (10) Patent No.: US 9,662,852 B2
(45) Date of Patent: May 30, 2017

(54) PLASTIC BAG MAKING APPARATUS

(71) Applicant: Totani Corporation, Kyoto (JP)

(72) Inventor: Hiroshi Nagata, Kyoto (JP)

(73) Assignee: Totani Corporation, Kyoto (JP)

( * ) Notice: Subject to any disclaimer, the term of this patent is extended or adjusted under 35 U.S.C. 154(b) by 455 days.

(21) Appl. No.: 14/538,016

(22) Filed: Nov. 11, 2014

(65) Prior Publication Data

US 2016/0129628 A1    May 12, 2016

(51) Int. Cl.
| | | |
|---|---|---|
| *B31B 1/00* | (2006.01) | |
| *B31B 19/10* | (2006.01) | |
| *B31B 19/14* | (2006.01) | |
| *B31B 19/26* | (2006.01) | |
| *B31B 19/64* | (2006.01) | |
| *B29L 5/00* | (2006.01) | |

(Continued)

(52) U.S. Cl.
CPC .............. *B31B 19/14* (2013.01); *B31B 1/00* (2013.01); *B31B 19/64* (2013.01); *B29C 65/02* (2013.01); *B29C 65/08* (2013.01); *B29C 65/7841* (2013.01); *B29C 66/112* (2013.01); *B29C 66/1122* (2013.01); *B29C 66/131* (2013.01); *B29C 66/232* (2013.01); *B29C 66/43* (2013.01); *B29C 66/474* (2013.01); *B29C 66/81427* (2013.01); *B29C 66/81431* (2013.01); *B29C 66/8322* (2013.01); *B29C 66/8511* (2013.01); *B29L 2005/00* (2013.01); *B31B 2219/14* (2013.01); *B31B 2219/269* (2013.01); *B31B 2219/9019* (2013.01); *B31B 2237/20* (2013.01); *B31B 2237/50* (2013.01)

(58) Field of Classification Search
CPC ....... B31B 1/00; B31B 19/00; B31B 2237/50; B31B 1/64; B31B 19/14; B31B 19/64
See application file for complete search history.

(56) References Cited

U.S. PATENT DOCUMENTS

| | | |
|---|---|---|
| 4,372,793 A | 2/1983 | Herz |
| 4,663,915 A | 5/1987 | Van Erden |

(Continued)

FOREIGN PATENT DOCUMENTS

| | | |
|---|---|---|
| JP | 2002-347788 | 12/2002 |
| JP | 2003-300540 | 10/2003 |

(Continued)

OTHER PUBLICATIONS

Australia Examination Report No. 1, Feb. 2016.

*Primary Examiner* — Andrew M Tecco
*Assistant Examiner* — Praachi M Pathak
(74) *Attorney, Agent, or Firm* — Kirschstein, Israel, Schiffmiller & Pieroni, P.C.

(57) ABSTRACT

A first body of fastener material is joined to a first web of panel material while a second body of fastener material is joined to a second web of panel material. The first and second bodies of fastener material are interposed between the first and second webs of panel material and aligned with each other after the first and second webs of panel material are superposed with each other. A third body of fastener material is joined to a web of side gusset material to be interposed between the first and second bodies of fastener material after the first and second webs of panel material are superposed with each other, the first and second bodies of fastener material being aligned with the third body of fastener material.

8 Claims, 6 Drawing Sheets

(51) Int. Cl.
*B29C 65/08* (2006.01)
*B29C 65/78* (2006.01)
*B29C 65/00* (2006.01)
*B29C 65/02* (2006.01)

(56) References Cited

U.S. PATENT DOCUMENTS

| | | | |
|---|---|---|---|
| 5,938,337 A | | 8/1999 | Provan |
| 6,425,847 B1 * | | 7/2002 | Broenstrup ............. B31B 19/00 493/186 |
| 2010/0154362 A1 | | 6/2010 | Jansen |
| 2011/0082019 A1 | | 4/2011 | Bannister |

FOREIGN PATENT DOCUMENTS

| | | |
|---|---|---|
| JP | 3655627 | 3/2005 |
| JP | 2011-006103 | 1/2011 |
| JP | 5439622 | 3/2014 |

* cited by examiner

PLASTIC BAG MAKING APPARATUS

TECHNICAL FIELD

The invention relates to an apparatus for successively making plastic bags each of which includes a panel portion, side gusset portions and a fastener portion.

BACKGROUND

Japanese Patent Publication No. 3,655,627 discloses an apparatus for successively making plastic bags each of which includes a panel portion and side gusset portions. In the apparatus, first and second webs of panel material are superposed with each other and fed longitudinally thereof. A web of side gusset material is folded into halves and supplied to the first web' of panel material to extend widthwise of the first web of panel material before the first and second webs of panel material are superposed with each other. The web of side gusset material is crosscut into a length corresponding to the width of the first and second webs of panel material. The web of side gusset material is then interposed between the first and second webs of panel material after the first and second webs of panel material are superposed with each other.

The apparatus includes a longitudinal seal device by which the first and second webs of panel material are heat sealed with each other longitudinally thereof after being superposed with each other. The apparatus further includes a cross seal device by which the first and second webs of panel material and the web of side gusset material are heat sealed with each other widthwise of the first and second webs of panel material after the first and second webs of panel material are superposed with each other. The apparatus further includes a cutter by which the first and second webs of panel material are crosscut widthwise thereof after being heat sealed. The panel portion is formed of the first and second webs of panel material. The side gusset portion is formed of the web of side gusset material. The apparatus can successively make plastic bags at high speed, resulting in high performance.

On the other hand, Japanese Laid-Open Patent Publication No. 347,788 of 2002 discloses a plastic bag including not only the panel portion and the side gusset portions but also a fastener portion. The panel portion is formed of first and second sheets of panel material. The side gusset portion is formed of a sheet of side gusset material.

The fastener portion extends along the top edge of plastic bag. The fastener portion has a specific structure, in which a first body of fastener material is joined to the first sheet of panel material while a second body of fastener material is joined to the second sheet of panel material within the plastic bag. A third body of fastener material is joined to the sheet of side gusset material within the plastic bag, the fastener portion being formed of the first, second and third bodies of fastener material. The first and second bodies of fastener material are meshing engaged with each other and with the third body of fastener material. The plastic bag can therefore be closed by the first, second and third bodies of fastener material. The first, second and third bodies of fastener material comprise parts of hook and loop touch fastener portion. The plastic bag would be used for various purposes to be high in utility, regardless of a problem of airtightness of hook and loop touch fastener portion.

It is therefore required to improve the apparatus of Japanese Patent No. 3,655,627 to successively make plastic bags each of which has the same structure as that of Japanese Laid-Open Patent Publication No. 347,788 of 2002.

SUMMARY OF THE INVENTION

It is therefore an object of the invention to provide an apparatus for successively making plastic bags each of which includes a panel portion, side gusset portions and a fastener portion, the fastener portion being formed of first, second and third bodies of fastener material to have a specific structure.

According to the invention, the apparatus includes a panel material feeding device by which first and second webs of panel material are superposed with each other and fed longitudinally thereof. The apparatus further includes a fastener material joining device by which a first body of fastener material is joined to the first web of panel material while a second body of fastener material is joined to the second web of panel material before the first and second webs of panel material are superposed with each other. The first and second bodies of fastener material extend longitudinally of the first and second webs of panel material. The first and second bodies of fastener material are then interposed between the first and second webs of panel material and aligned with each other after the first and second webs of panel material are superposed with each other. The apparatus further includes a side gusset material supply device by which a web of side gusset material is withdrawn from a roll, folded into halves and supplied to the first web of panel material to extend widthwise of the first web of panel material before the first and second webs of panel material are superposed with each other. The web of side gusset material has a width. The web of side gusset material is then interposed between the first and second webs of panel material after the first and second webs of panel material are superposed with each other. The apparatus further includes an additional joining device by which a third body of fastener material is joined to the web of side gusset material after the web of side gusset material is withdrawn from the roll and before the web of side gusset material is folded into halves and supplied to the first web of panel material. The third body of fastener material extends widthwise of the web of side gusset material and has a length corresponding to the width of the web of side gusset material. The web of side gusset material is then folded into halves and supplied to the first web of panel material so that the third body of fastener material is folded by the web of side gusset material and interposed between the first and second bodies of fastener material after the first and second webs of panel material are superposed with each other, the first and second bodies of fastener material being aligned with the third body of fastener material. The panel portion is formed of the first and second webs of panel material. The side gusset portion is formed of the web of side gusset material. The fastener portion is formed of the first, second and third bodies of fastener material.

In a preferred embodiment, the first, second and third bodies of fastener material comprise parts of hook and loop touch fastener portion. The web of side gusset material is crosscut or torn off into a length corresponding to the width of the first and second webs of panel material after being folded into halves and after or before being supplied to the first web of panel material. The third body of fastener material is crosscut or torn off into the length corresponding to the width of the web of side gusset material after or before being supplied to the web of side gusset material.

The first and second webs of panel material are fed in a state of being superposed with each other. The first and second webs of panel material are then separated and spaced from each other. The web of side gusset material is supplied to the first web of panel material after the first and second webs of panel material are spaced from each other. The first and second webs of panel material are then superposed with each other again so that the web of side gusset material is interposed between the first and second webs of panel material while the third body of fastener material is interposed between the first and second bodies of fastener material.

The first and second bodies of fastener material are interposed between the first and second webs of panel material before the first and second webs of panel material are separated from each other, the first body of fastener material being joined to the first web of panel material, the second body of fastener material being joined to the second web of panel material.

The fastener material joining device comprises a fastener material seal device by which the first body of fastener material is heat sealed with the first web of panel material to be joined thereto while the second body of fastener material is heat sealed with the second web of panel material to be joined thereto. The additional joining device comprises an additional seal device by which the third body of fastener material is heat sealed with the web of side gusset material to be joined thereto.

The apparatus further includes a longitudinal seal device by which the first and second webs of panel material are heat sealed with each other longitudinally thereof after being superposed with each other. The apparatus further includes a cross seal device by which the first and second webs of panel material and the web of side gusset material are heat sealed with each other widthwise of the first and second webs of panel material after the first and second webs of panel material are superposed with each other. The apparatus further includes a cutter by which the first and second webs of panel material are crosscut widthwise thereof after being heat sealed.

BEST MODE TO CARRY OUT THE INVENTION

Figure 1:
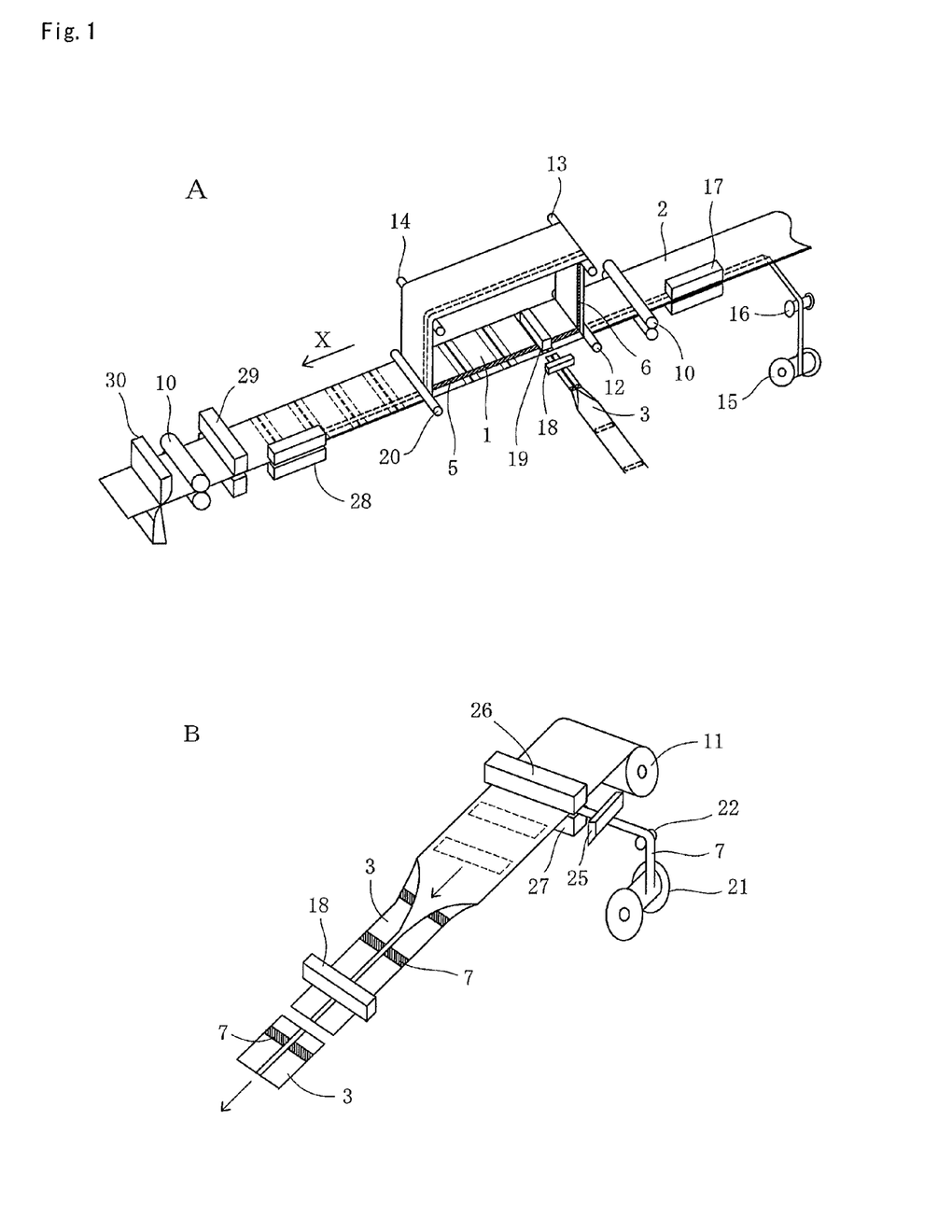
FIG. 1 is a perspective view (A) of a preferred embodiment of the invention and a perspective view (B) of the additional joining device of the apparatus of (A).
Figure 3:
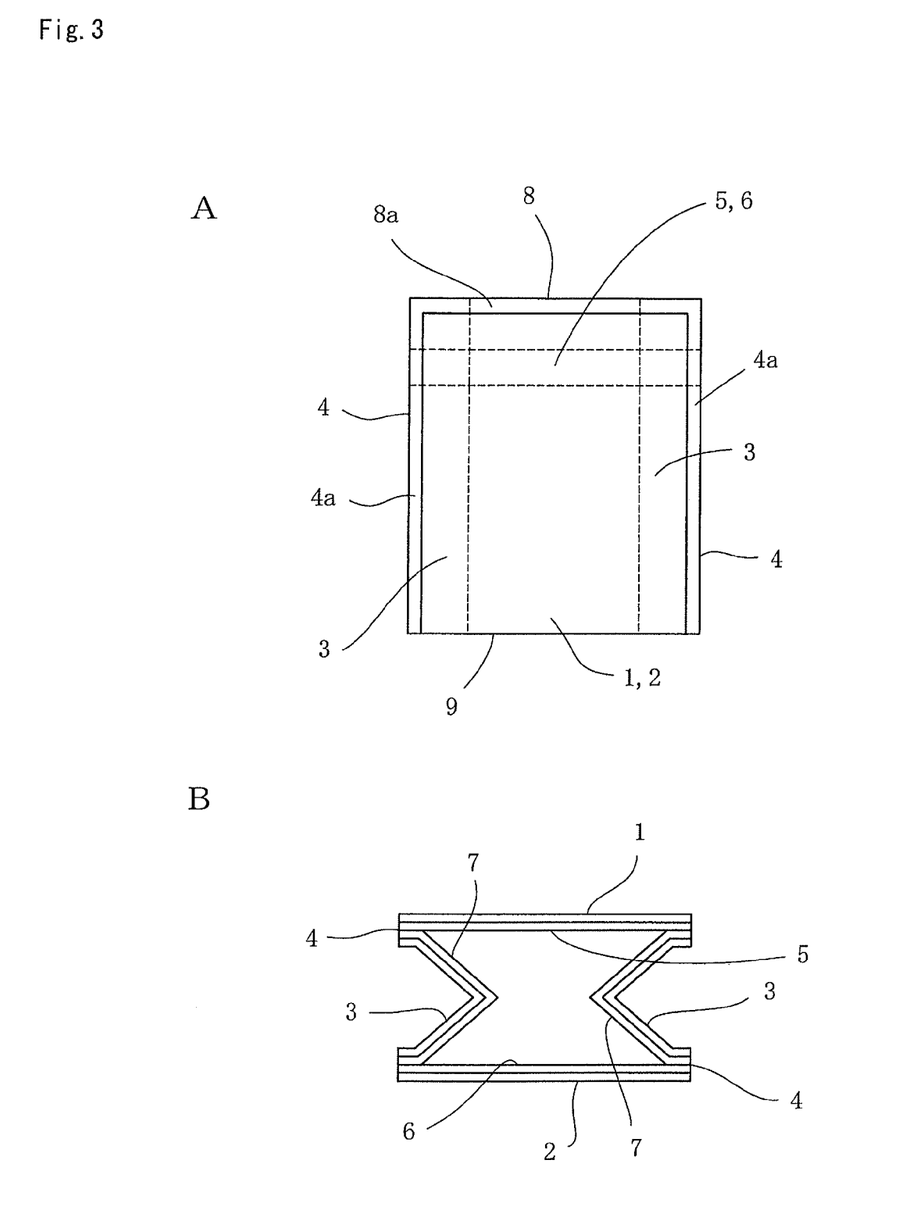
FIG. 3 is an explanatory view (A) of the plastic bag obtained by the apparatus of FIG. 1 and a sectional view (B) of the plastic bag of (A).

Turning now to the drawings, FIG. 1 illustrates an apparatus for successively making plastic bags of FIG. 3, according to the invention. The plastic bag includes a panel portion, side gusset portions and a fastener portion, as in the case of the plastic bag of Japanese Laid-Open Patent Publication No. 347,788 of 2002. The panel portion is formed of first and second webs of panel material 1 and 2 which are superposed with each other and crosscut into a length, as shown in FIG. 3. The side gusset portions are formed of webs of side gusset material 3 to extend opposite side edges 4 of plastic bag, the webs of side gusset material 3 being also crosscut into a length. In addition, the web of side gusset material 3 is folded into halves and interposed between the webs of panel material 1 and 2. The webs of panel material 1 and 2 and the webs of side gusset material 3 are heat sealed with each other along the opposite side edges 4 of plastic bag so that heat seal portions 4a are formed along the opposite side edges 4 of plastic bag.

On the other hand, the fastener portion is formed of first, second and third bodies of fastener material 5, 6 and 7 to extend along the top edge 8 of plastic bag. The first body of fastener material 5 is joined to the first web of panel material 1 while the second body of fastener material 6 is joined to the second web of panel material 2 within the plastic bag. The third body of fastener material 7 is joined to the web of side gusset material 3 within the plastic bag. The first and second webs of panel material 1 and 2 are heat sealed with each other and with the webs of side gusset material 3 along the top edge 8 of plastic bag so that a heat seal portion 8a is formed along the top edge 8 of plastic bag.

The plastic bag is filled with content at the bottom edge 9 thereof, after making the plastic bag. The first and second webs of panel material 1 and 2 are then heat sealed with each other and with the webs of side gusset material 3 along the bottom edge 9. In addition, the plastic bag is torn off and opened along the top edge 8 thereof after being filled with the content so that the content can be discharged or taken out of the plastic bag. The first and second bodies of fastener material 5 and 6 are then meshing engaged with each other between the webs of side gusset material 3 and with the third body of fastener material 7 at the positions of the webs of side gusset material 3 so that the plastic bag can be closed by the first, second and third bodies of fastener material 5, 6 and 7.

In order to make the plastic bag of FIG. 3, in the apparatus of FIG. 1, the first and second webs of panel material 1 and 2 are superposed with each other and fed longitudinally thereof. In the embodiment, the apparatus includes a panel material feeding device comprising feeding rollers 10 to which the first and second webs of panel material 1 and 2 are directed to be superposed with each other. The feeding rollers 10 are rotated intermittently by a motor so that the first and second webs of panel material 1 and 2 can be fed longitudinally thereof and intermittently. The first web of panel material 1 is a lower web of panel material comprising a plastic film while the second web of panel material 2 is an upper web of panel material comprising a plastic film. The feeding direction X is predetermined longitudinally of the webs of panel material 1 and 2.

The apparatus further includes a fastener material joining device by which a first body of fastener material 5 is joined to the first web of panel material 1 while a second body of fastener material 6 is joined to the second web of panel material 2 before the first and second webs of panel material 1 and 2 are superposed with each other. The first and second bodies of fastener material 5 and 6 extend longitudinally of the first and second webs of panel material 1 and 2. The first and second bodies of fastener material 5 and 6 are then interposed between the first and second webs of panel material 1 and 2 and aligned and meshing engaged with each other after the first and second webs of panel material 1 and 2 are superposed with each other. The apparatus further includes a side gusset material supply device by which a web of side gusset material 3 is withdrawn from a roll 11, folded into halves and supplied to and put on the first web of panel material 1 to extend widthwise of the first web of panel material 1 before the first and second webs of panel material 1 and 2 are superposed with each other. The web of side gusset material 3 is then interposed between the first and second webs of panel material 1 and 2 after the first and second webs of panel material 1 and 2 are superposed with each other. The first and second bodies of fastener material 5 and 6 comprise parts of hook and loop touch fastener portion, as in the case of those of Japanese Patent Laid-Open Patent Publication No. 347,788 of 2002. The web of side gusset material 3 comprises a plastic film and has a width.

In the embodiment, the first and second webs of panel material 1 and 2 are fed in a state of being superposed with each other, and directed to a guide roller 12. The second web of panel material 2 is then directed to a guide roller 13 to be guided by the guide rollers 12 and 13 and pulled upwardly so that the first and second webs of panel material 1 and 2 are fed intermittently to be separated from each other. In addition, the second web of panel material 2 is directed to a guide roller 14 to be guided by the guide roller 14 so that the first and second webs of panel material 1 and 2 are fed intermittently to be spaced from each other. The web of side gusset material 3 is supplied to and put on the first web of panel material 1 to extend widthwise of the first web of panel material 1 after the first and second webs of panel material 1 and 2 are spaced from each other and when the first and second webs of panel material 1 and 2 are stopped temporarily whenever being fed intermittently.

The first and second bodies of fastener material 5 and 6 are withdrawn from a reel 15, directed to a guide roller 16 and supplied to and interposed between the first and second webs of panel material 1 and 2 before the first and second webs of panel material 1 and 2 are separated from each other, the first body of fastener material 5 being joined to the first web of panel material 1, the second body of fastener material 6 being joined to the second web of panel material 2. The first and second bodies of fastener material 5 and 6 are aligned and meshing engaged with each other when being interposed between the first and second webs of panel material 1 and 2. The first and second bodies of fastener material 5 and 6 extend longitudinally of the first and second webs of panel material 1 and 2.

The fastener material joining device comprises a fastener material seal device by which the first body of fastener material 5 is heat sealed with the first web of panel material 1 to be joined thereto while the second body of fastener material 6 is heat sealed with the second web of panel material 2 to be joined thereto. The fastener material seal device includes seal bars 17 extending longitudinally of the first and second webs of panel material 1 and 2 to be disposed on opposite sides thereof. The first and second webs of panel material 1 and 2 and the first and second bodies of fastener material 5 and 6 are sandwiched between and heated by the seal bars 17 so that the first body of fastener material 5 is heat sealed with the first web of panel material 1 to be joined thereto while the second body of fastener material 6 is heat sealed with the second web of panel material 2 to be joined thereto, when the first and second webs of panel material 1 and 2 are stopped temporarily whenever being fed intermittently.

The second web of panel material 2 is then directed to the guide rollers 12 and 13 so that the first and second webs of panel material 1 and 2 are separated from each other. The first and second bodies of fastener material 5 and 6 are pulled by the first and second webs of panel material 1 and 2 to be separated from each other.

In the embodiment, the web of side gusset material 3 has a width twice as much as that of FIG. 3, which is folded into halves on opposite sides of the longitudinal centerline thereof to be superposed into two layers, as in the case of the apparatus of Japanese Patent Publication No. 3,655,627. In addition, the side gusset supply device includes an autohand or finger moved widthwise of the first web of panel material 1. The web of side gusset material 3 is gripped and held by the autohand or finger to be pulled and fed widthwise of the first web of panel material 1. The side gusset supply device further includes a guide plate engaged with the web of side gusset material 3, the web of side gusset material 3 being guided by the guide plate to be folded into halves when being fed. Furthermore, the web of side gusset material 3 is crosscut into a length corresponding to the width of the first and second webs of panel material 1 and 2 after being folded into halves. For example, the side gusset material supply device includes a cutter 18 by which the web of side gusset material 3 is crosscut into the length before being supplied to the first web of panel material 1. The web of side gusset material 3 is then fed by the autohand or finger to be supplied to and put on the first web of panel material 1. The apparatus further includes a temporarily fixing device by which the web of side gusset material 3 is temporarily fixed to the first web of panel material 1 after being supplied to the first web of panel material 1. The temporarily fixing device comprises a ultrasonic seal or heat seal device including a seal bar and a receiver 19. The first web of panel material 1 and the web of side gusset material 3 are sandwiched between the seal bar and the receiver 19 so that the web of side gusset material 3 is ultrasonic sealed or heat sealed with the first web of panel 1 to be temporarily fixed thereto. The first and second webs of panel material 1 and 2 are then fed intermittently again so that the web of side gusset material 3 is fed by the first web of panel material 1. The web of side gusset material 3 may be temporarily fixed to the first web of panel material 1 and crosscut into the length, after being supplied to the first web of panel material 1.

The web of side gusset material 3 may be temporarily fixed to the first web of panel material 1 and torn off into the length, after being supplied to the first web of panel material 1. For example, the side gusset material supply device includes a perforating blade by which a perforation is formed in the web of side gusset material 3. The web of side gusset material 3 is then supplied and temporarily fixed to the first web of panel material 1. The perforation comes close to the receiver 19 when the web of side gusset material 3 is supplied to the first web of panel material 1. The side gusset material supply device further includes a movable gripper by which the web of side gusset material 3 is gripped and held after temporarily fixed to the first web of panel material 1. The gripper is disposed at distances from the receiver 19 and the perforation and moved away from the perforation so that the web of side gusset material 3 is torn off along the perforation. A fixed gripper may be disposed between the receiver 19 and the perforation, by which the web of side gusset material 3 is gripped and held along with the first web of panel material 1 to be torn off reliably. The web of side gusset material 3 may be torn off into the length before being supplied to the first web of panel material 1.

The first and second webs of panel material 1 and 2 are then directed to and guided by a guide roller 20 to be superposed with each other again. The web of side gusset material 3 is therefore interposed between the first and second webs of panel material 1 and 2.

The apparatus further includes an additional joining device by which a third body of fastener material 7 is joined to the web of side gusset material 3 after the web of side gusset material 3 is withdrawn from the roll 11 and before the web of side gusset material 3 is folded into halves and supplied to the first web of panel material 1. The third body of fastener material 7 extends widthwise of the web of side gusset material 3 and has a length corresponding to the width of the web of side gusset material 3. The web of side gusset material 3 is then folded into halves so that the third body of fastener material 7 is folded by the web of side gusset material 3 and interposed between the first and second bodies of fastener material 5 and 6 after the first and second webs of panel material 1 and 2 are superposed with each other, the first and second bodies of fastener material 5 and 6 being aligned and meshing engaged with the third body of fastener material 7. The third body of fastener material 7 comprises a part of hook and loop touch fastener portion.

Figure 2:
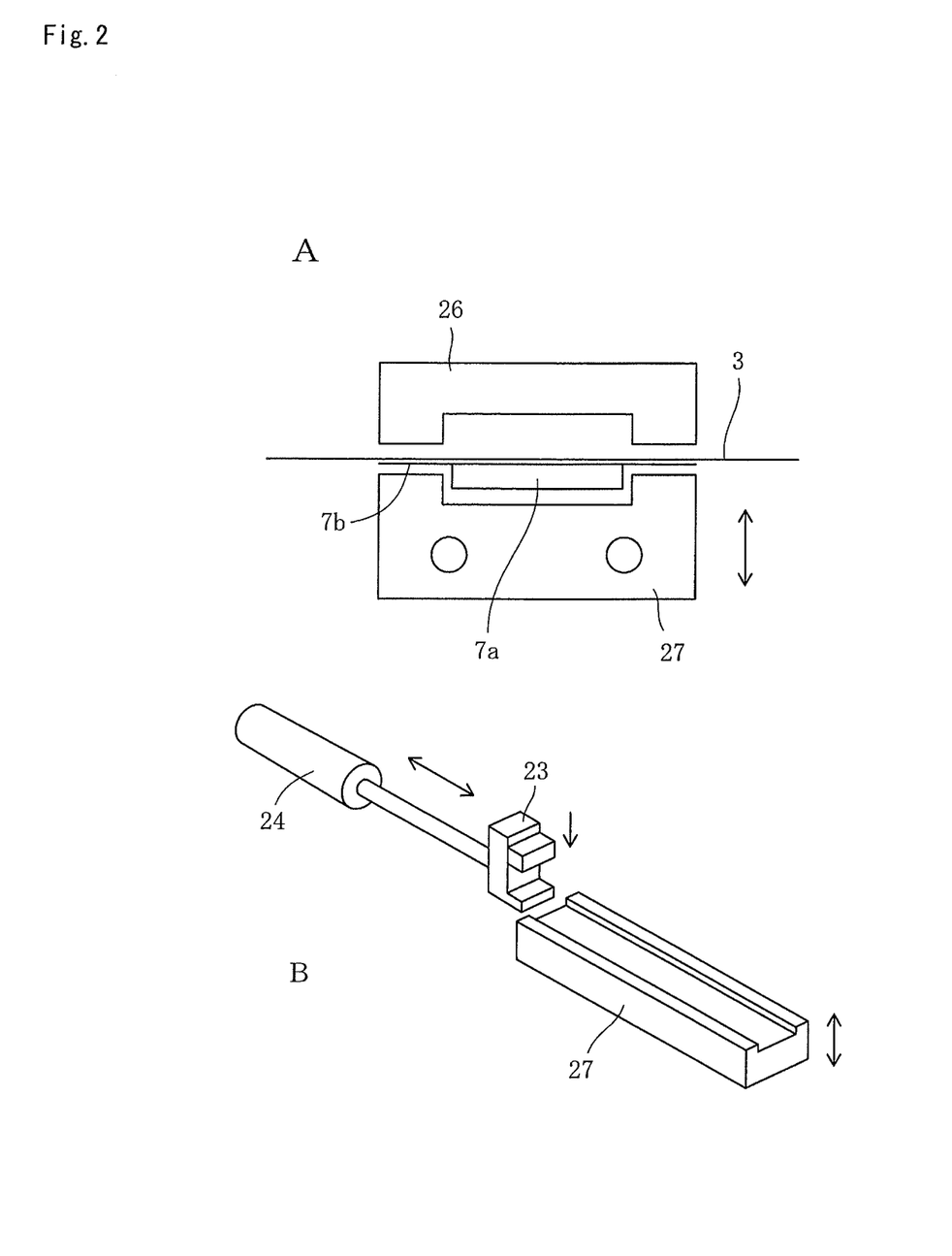
FIG. 2 is a sectional view (A) of the additional joining device of the apparatus of FIG. 1 when the third body of fastener material is heat sealed with the web of side gusset material and a perspective view (B) of the autohand of the apparatus of FIG. 1.

In the embodiment, the third body of fastener material 7 is withdrawn from a reel 21 and directed to and guided by a guide roller 22 to extend toward the web of side gusset material 3. The apparatus includes an autohand or finger 23 moved widthwise of the web of side gusset material 3, as shown in FIG. 2. The autohand or finger 23 may be connected to and moved by a cylinder 24. The third body of fastener material 7 is gripped and held by the autohand or finger 23 to be pulled and fed widthwise of the web of side gusset material 3 and supplied thereto. In addition, the third body of fastener material 7 is crosscut into the length corresponding to the width of the webs of side gusset material 3 after or before being supplied to the web of side gusset material 3. For example, the apparatus includes a cutter 25 by which the third body of fastener material 7 is crosscut into the length. The third body of fastener material 7 may be torn off into the length, after or before being supplied to the web of side gusset material 3. For example, the apparatus includes a perforating blade by which a perforation is formed in the third body of fastener material 7. The perforation comes close to the web of side gusset material 3 when the third body of fastener material 7 is supplied to the web of side gusset material 3. The apparatus further includes a fixed gripper by which the third body of fastener material 7 is gripped and held. The gripper is disposed at distances from the web of side gusset material 3 and the perforation. The autohand or finger 23 is then moved away from the perforation so that the third body of fastener material 7 is torn off along the perforation to be disposed at the position of the web of side gusset material 3. The apparatus may include a movable gripper moved away from the perforation so that the third body of fastener material 7 is torn off along the perforation.

The additional fixing device comprises an additional seal device by which the third body of fastener material 7 is heat sealed with the web of side gusset material 3 to be joined thereto. The additional seal device includes a seal bar 26 and a receiver 27 extending widthwise of the web of side gusset material 3 and disposed on opposite sides of the web of side gusset material 3 and the third body of fastener material 7. The receiver 27 is moved toward the seal bar 26 after the third body of fastener material 7 is disposed at the position of the web of side gusset material 3. The web of side gusset material 3 and the third body of fastener material 7 are therefore sandwiched between the seal bar 26 and the receiver 27 and heated by the seal bar 26 so that the third body of fastener material 7 is heat sealed with the web of side gusset material 3 to be joined thereto. The third body of fastener material 7 may include a meshing engaged portion 7a formed integrally with a tape 7b, the tape 7b being heat sealed with the web of side gusset material 3.

Subsequently, the web of side gusset material 3 is supplied to the first web of panel material 1 and crosscut or torn off into the length corresponding to the width of the first web of panel material 1. The third body of fastener material 7 is disposed at the position of the first and second bodies of fastener material 5 and 6. The first and second webs of panel material 1 and 2 are then directed to the guide roller 20 and superposed with each other. It should therefore be understood that the third body of fastener material 7 is interposed between the first and second bodies of fastener material 5 and 6, the first and second bodies of fastener material 5 and 6 being aligned and meshing engaged with the third body of fastener material 7, when the first and second webs of panel material 1 and 2 are superposed with each other.

The apparatus further includes a longitudinal seal device by which the first and second webs of panel material 1 and 2 are heat sealed with each other longitudinally thereof after being superposed with each other and when being stopped temporarily whenever being fed intermittently. The longitudinal seal device includes seal bars 28 extending longitudinally of the first and second webs of panel material 1 and 2 to be disposed on opposite sides thereof. The first and second webs of panel material 1 and 2 are sandwiched between and heated by the seal bars 28 to be heat sealed with each other and with the web of side gusset material 3. The first and second webs of panel material 1 and 2 are heat sealed along one of the side edges thereof, to make the heat seal portion 8a of FIG. 3 formed.

The apparatus further includes a cross seal device by which the first and second webs of panel material 1 and 2 and the web of side gusset material 3 are heat sealed with each other widthwise of the first and second webs of panel material 1 and 2 after the first and second webs of panel material 1 and 2 are superposed with each other and when the first and second webs of panel material 1 and 2 are stopped temporarily whenever being fed intermittently. The cross seal device includes seal bars 29 extending widthwise of the first and second webs of panel material 1 and 2 to be disposed on opposite sides thereof. The first and second webs of panel material 1 and 2 and the web of side gusset material 3 are sandwiched between and heated by the seal bars 29 to be heat sealed with each other. The first and second webs of panel material 1 and 2 and the web of side gusset material 3 are heat sealed along the longitudinal centerline of the web of side gusset material 3, to make the heat seal portion 4a of FIG. 3 formed.

The apparatus further includes a cutter 30 by which the first and second webs of panel material 1 and 2 and the web of side gusset material 3 are crosscut widthwise of the first and second webs of panel material 1 and 2 after being heat sealed and when the first and second webs of panel material 1 and 2 are stopped temporarily whenever being fed intermittently. The first and second webs of panel material 1 and 2 and the web of side gusset material 3 are crosscut along the longitudinal centerline of the web of side gusset material 3, to make the opposite side edge 4 of FIG. 3 formed, the top edge 8 and the bottom edge 9 of FIG. 3 being formed by the opposite side edges of the webs of panel material 1 and 2.

It should be understood that each of the first and second webs of panel material 1 and 2 and the web of side gusset material 3 comprises a laminated film composed of a sealant laminated on a base material. The webs of panel material 1 and 2 have inner surfaces formed by the sealant and outer surfaces formed by the base material when being superposed on each other. The web of side gusset material 3 has outer surfaces formed by the sealant and inner surfaces formed by the base material when being folded into halves, as also in the case of the apparatus of Japanese Patent No. 3,655,627.

The apparatus can therefore successively make the plastic bags of FIG. 3. The plastic bag includes the panel portion formed by the first and second webs of panel material 1 and 2, the side gusset portion formed by the web of side gusset material 3 and the fastener portion formed by the first, second and third bodies of fastener material 5, 6 and 7.

In the apparatus, the first and second webs of panel material 1 and 2 are fed longitudinally thereof. The web of side gusset material 3 is supplied to the first web of panel material 1 to extend widthwise of the first web of panel material 1. The first and second webs of panel material 1 and 2 are then heat sealed with each other longitudinally thereof. The first and second webs of panel material 1 and 2 and the web of side gusset material 3 are heat sealed with each other widthwise of the first and second webs of panel material 1 and 2. The first and second webs of panel material 1 and 2 are then crosscut widthwise thereof, after being heat sealed, as in the case of the apparatus of Japanese Patent No. 3,655,627. The apparatus can therefore successively make the plastic bags at high speed, resulting in high performance.

In addition, the plastic bag includes the fastener portion formed by the first, second and third bodies of fastener material 5, 6 and 7 to have the specific structure. The first and second bodies of fastener material 5 and 6 are meshing engaged with each other and with the third body of fastener material 7. The plastic bag can therefore be closed by the first, second and third fastener material 5, 6 and 7, as in the case of the plastic bag of Japanese Laid-Open Patent Publication No. 347,788 of 2002. Accordingly, the plastic bag would be used for various purposes to be high in utility.

Furthermore, in the apparatus, the third body of fastener material 7 is joined to the web of side gusset material 3 after the web of side gusset material 3 is withdrawn from the roll 11, as described previously. The third body of fastener material 7 has therefore no problem of position when being joined to the web of side gusset material 3 even if the web of side gusset material 3 is elongated by tension when being withdrawn from the roll 11. The third body of fastener material 7 is disposed in position when being supplied to the web of side gusset material 3. As a result, the third body of fastener material 7 can be interposed between the first and second bodies of fastener material 5 and 6 after the first and second webs of panel material 1 and 2 are superposed with each other. The first and second bodies of fastener material 5 and 6 are aligned with the third body of fastener material 7.

In addition, the third body of fastener material 7 is joined to the web of side gusset material 3 before the web of side gusset material 3 is folded into halves. In other words, the third body of fastener material 7 is joined to the web of side gusset material 3 which is not folded. It can therefore be joined without difficulty. The third body of fastener material 7 is then folded by the web of side gusset material 3 when the web of side gusset material 3 is folded into halves. The third body of fastener material 7 has therefore not to be folded into halves when being supplied to the web of side gusset material 3.

Figure 4:
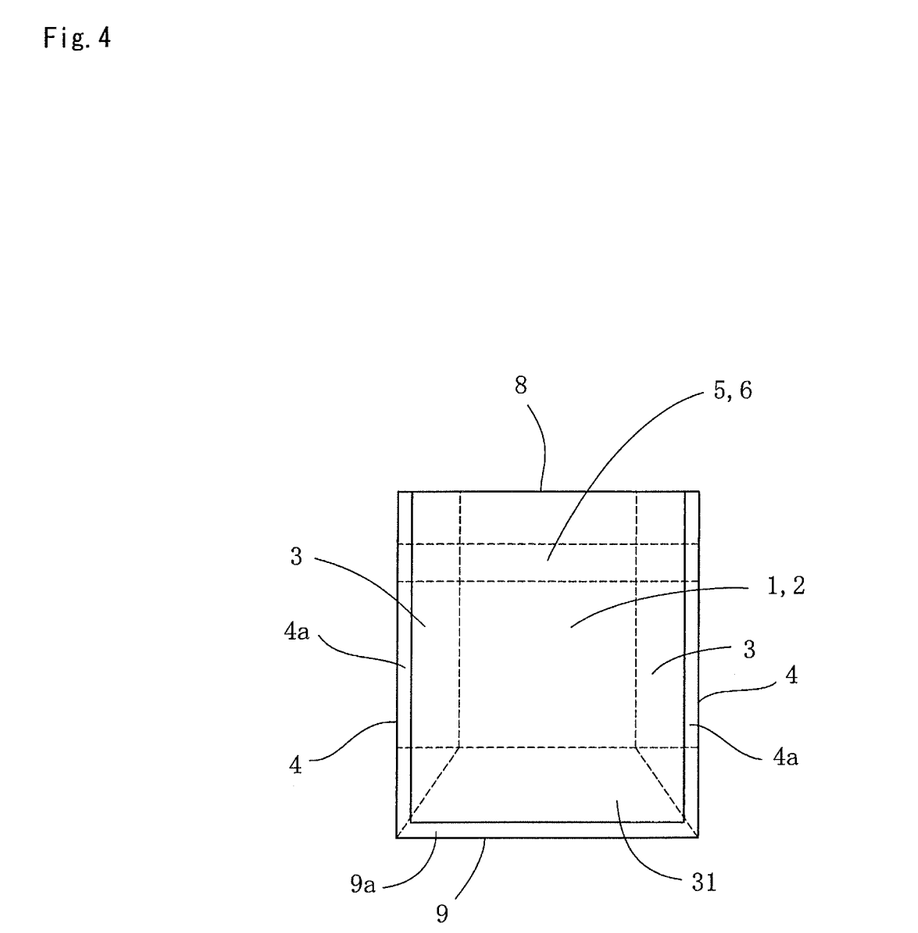
FIG. 4 is an explanatory view of another embodiment.

The apparatus may be arranged to successively make plastic bags of FIG. 4. The plastic bag is filled with content at the top edge 8 thereof, after making the plastic bag. The first and second webs of panel material 1 and 2 are then heat sealed with each other and with the webs of side gusset material 3 along the top edge 8.

The plastic bag also includes the panel portion, the side gusset portions and the fastener portion. The panel portion is formed by the first and second webs of panel material 1 and 2. The side gusset portion is formed by the web of side gusset material 3. The fastener portion is formed by the first, second and third bodies of fastener material 5, 6 and 7. In addition, the plastic bag includes a bottom gusset portion formed of a web of bottom gusset material 31. The first and second webs of panel material 1 and 2 and the web of bottom gusset material 31 are heat sealed with each other along the bottom edge 9 of plastic bag so that a heat seal portion 9a is formed along the bottom edge 9 of plastic bag.

In order to successively make the plastic bags of FIG. 4, for example, the first or second web of panel material 1 or 2 is folded and folded back along a longitudinal folded line and a longitudinal folded back line to have a folded portion formed therein, the web of bottom gusset material 31 being formed by the folded portion, as in the case of the apparatus of Japanese Patent Publication No. 3,655,627. The apparatus may include a bottom gusset material supply device by which the web of bottom gusset material 31 is supplied to be interposed between the first and second webs of panel material 1 and 2. The apparatus further includes a longitudinal seal device by which the first and second webs of panel material 1 and 2 and the web of bottom gusset material 31 are heat sealed with each other longitudinally of the first and second webs of panel material 1 and 2.

Figure 5:
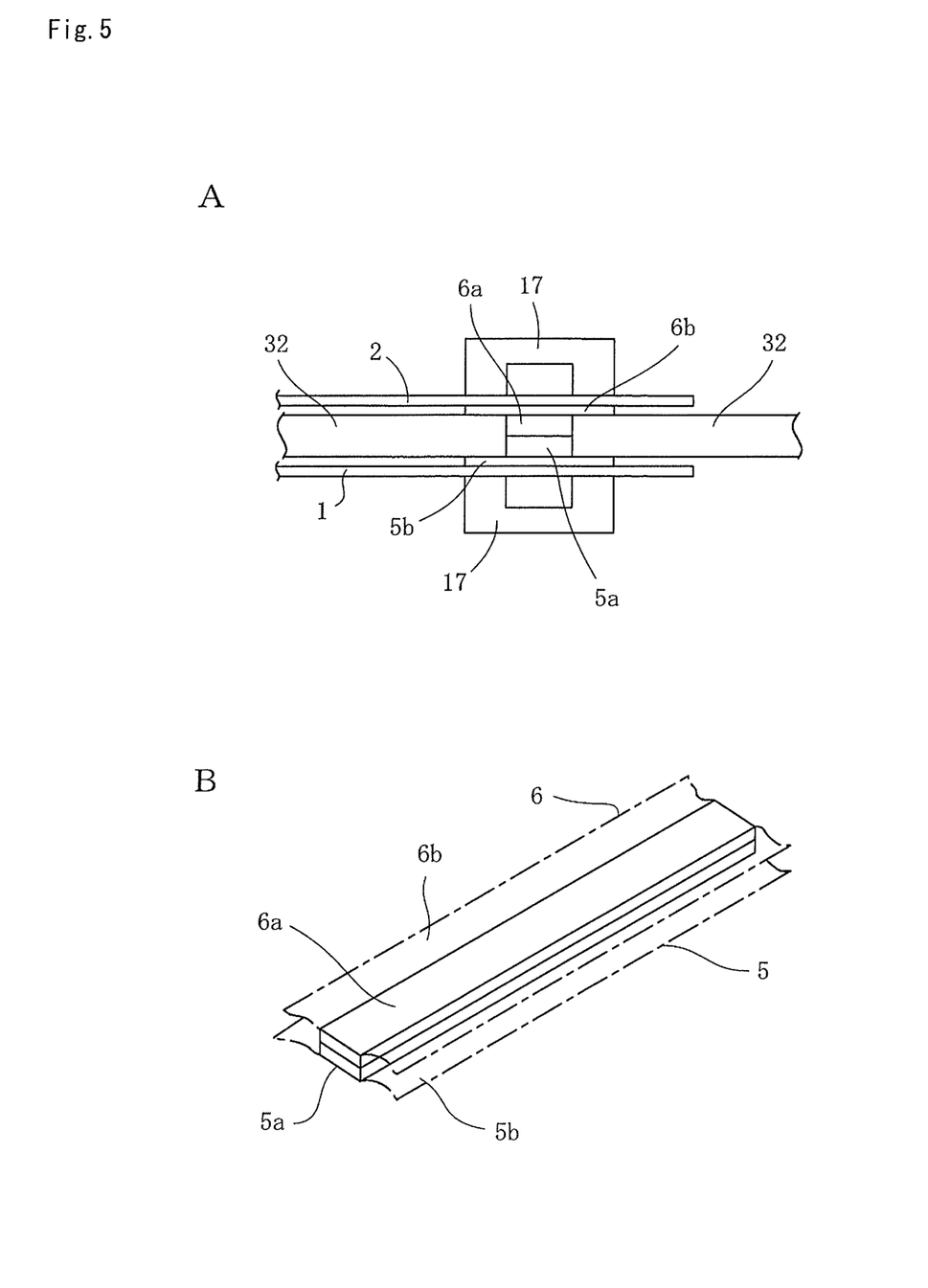
FIG. 5 is a sectional view (A) of another embodiment and a perspective view (B) of the first and second bodies of fastener material of (A).

In the apparatus of FIG. 1, the first and second bodies of fastener material 5 and 6 may include meshing engaged portions 5a and 6a formed integrally with tapes 5b and 6b, as shown in FIG. 5. The fastener material seal device may include seal bars 17 by which the first and second webs of panel material 1 and 2 and the first and second bodies of fastener material 5 and 6 are heat sealed with each other, the seal bars 17 being channel shaped. In addition, plates 32 are inserted between the tapes 5b and 6b on opposite sides of the meshing engaged portions 5a and 6a. The first web of panel material 1 and the tape 5b are sandwiched between the seal bar 17 and the plate 32 to be heat sealed with each other while the second web of panel material 2 and the tape 6b are sandwiched between the seal bar 17 and the plate 32 to be heat sealed with each other.

In the apparatus of FIG. 1, not only the first and second webs of panel material 1 and 2 and the web of side gusset material 3 but also the first, second and third bodies of fastener material 5, 6 and 7 are sandwiched between the side seal bars 29 when the first and second webs of panel material 1 and 2 and the web of side gusset material 3 are heat sealed with each other. The first, second and third bodies of fastener material 5, 6 and 7 increases the thickness in all. In this connection, pushers may be disposed on opposite sides of the first and second webs of panel material 1 and 2 so that the first and second webs of panel material 1 and 2, the web of side gusset material 3 and the first, second and third bodies of fastener material 5, 6 and 7 are compressed by the pushers to decrease the thickness in all, before being heat sealed.

Figure 6:
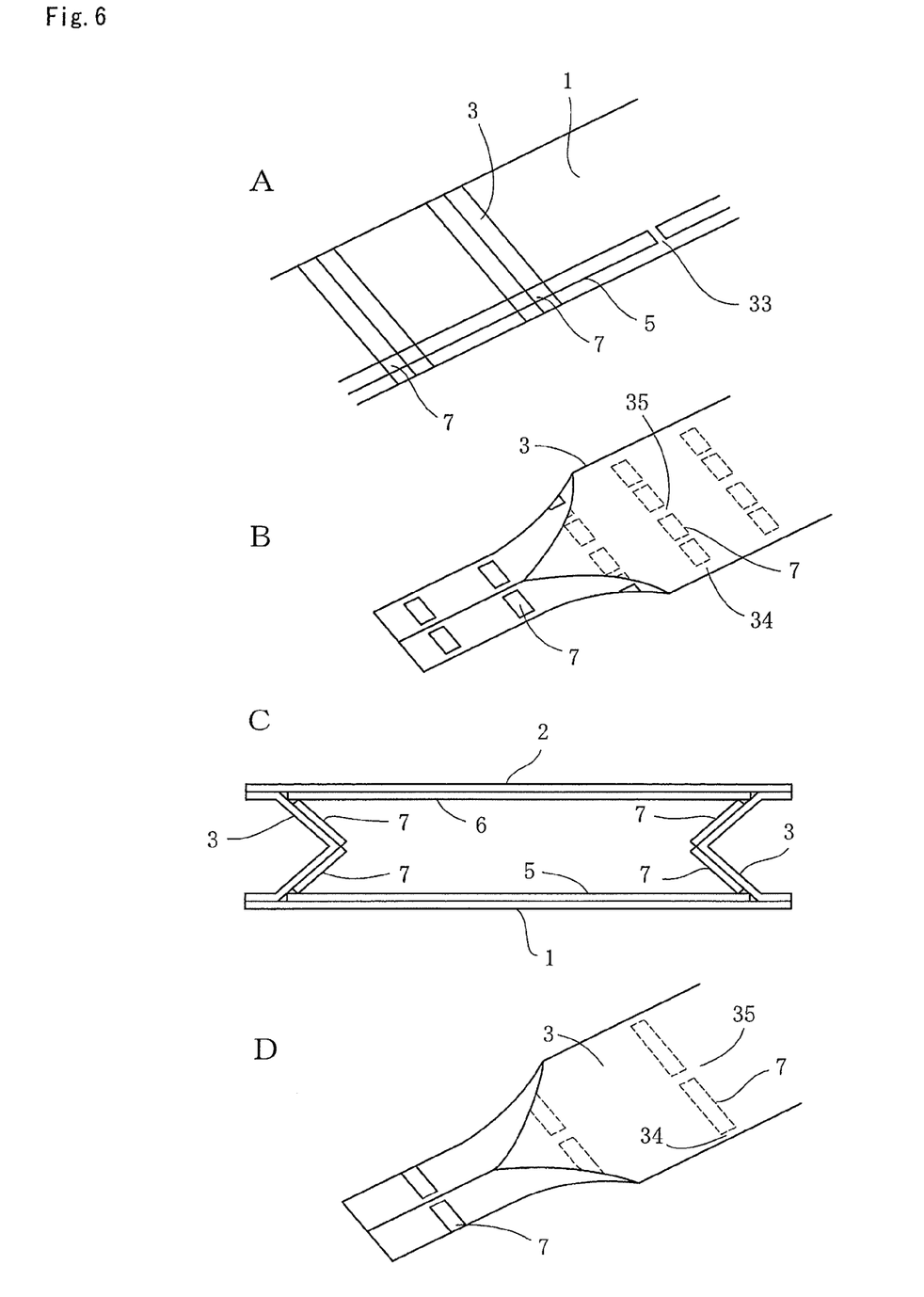
FIG. 6 is a perspective view (A) of another embodiment, a perspective view (B) of another embodiment, a sectional view (C) of the webs of panel material of (A) and the sheet of side gusset material of (B) combined with each other and a perspective view (D) of another embodiment.

FIG. 6 illustrates another embodiment in which the first and second bodies of fastener material 5 and 6 are divided into divided portions so that clearances 33 are formed between the divided portions (FIG. 6A). The first and second webs of panel material 1 and 2 and the web of side gusset material 3 are then heat sealed with each other at the clearance 33 by the seal bars 29. In addition, clearances 34 are formed between the third body of fastener material 7 and the opposite side edges of the web of side gusset material 3 (FIG. 6B). The third body of fastener material 7 is divided into four portions so that clearances 35 are formed between the divided portions 7. The divided portions 7 are disposed on opposite sides of the longitudinal centerline of the web of side gusset material 3 along which the web of side gusset material 3 is folded into halves. In this case, the first and second webs of panel material 1 and 2 and the web of side gusset material 3 are heat sealed with each other conveniently by the seal bars 29 by reason of no first, second and third bodies of fastener material 5, 6 and 7 being disposed (FIG. 6C).

The third body of fastener material 7 may be divided into two portions (FIG. 6D).

What is claimed is:

1. An apparatus for successively making plastic bags each of which includes a panel portion, side gusset portions and a fastener portion, the apparatus comprising:
    a panel material feeding device by which first and second webs of panel material are superposed with each other and fed longitudinally thereof;
    a fastener material joining device by which a first body of fastener material is joined to the first web of panel material while a second body of fastener material is joined to the second web of panel material before the first and second webs of panel material are superposed with each other, the first and second bodies of fastener material extending longitudinally of the first and second webs of panel material, the first and second bodies of fastener material being then interposed between the first and second webs of panel material and aligned with each other after the first and second webs of panel material are superposed with each other;
    guide rollers by which the first and second webs of panel material are separated and spaced from each other;
    a further guide roller by which the first and second webs of panel material are superposed with each other again;
    a side gusset material supply device by which a web of side gusset material is withdrawn from a roll, folded into halves and supplied to the first web of panel material to extend widthwise of the first web of panel material before the first and second webs of panel material are superposed with each other again, the web of side gusset material having a width, the web of side gusset material being then interposed between the first and second webs of panel material after the first and second webs of panel material are superposed with each other again; and
    an additional joining device by which a third body of fastener material is joined to the web of side gusset material after the web of side gusset material is withdrawn from the roll and before the web of side gusset material is folded into halves and supplied to the first web of panel material, the third body of fastener material extending widthwise of the web of side gusset material and having a length corresponding to the width of the web of side gusset material, the web of side gusset material being then folded into halves and supplied to the first web of panel material so that the third body of fastener material is folded by the web of side gusset material and interposed between the first and second bodies of fastener material after the first and second webs of panel material are superposed with each other again, the first and second bodies of fastener material being aligned with the third body of fastener material, the panel portion being formed of the first and second webs of panel material, the side gusset portion being formed of the web of side gusset material, the fastener portion being formed of the first, second and third bodies of fastener material.

2. The apparatus as set forth in claim 1 wherein the first, second and third bodies of fastener material comprise parts of hook and loop touch fastener portion.

3. The apparatus as set forth in claim 1 wherein the web of side gusset material is crosscut or torn off into a length corresponding to the width of the first and second webs of panel material after being folded into halves and after or before being supplied to the first web of panel material.

4. The apparatus as set forth in claim 1 wherein the third body of fastener material is crosscut or torn off into the length corresponding to the width of the webs of side gusset material after or before being supplied to the web of side gusset material.

5. The apparatus as set forth in claim 1 wherein the first and second webs of panel material are fed in a state of being superposed with each other, the first and second webs of panel material being then separated and spaced from each other, the web of side gusset material being supplied to the first web of panel material after the first and second webs of panel material are spaced from each other, the first and second webs of panel material being then superposed with each other again so that the web of side gusset material is interposed between the first and second webs of panel material while the third body of fastener material is interposed between the first and second bodies of fastener material.

6. The apparatus as set forth in claim 5 wherein the first and second bodies of fastener material are interposed between the first and second webs of panel material before the first and second webs of panel material are separated from each other, the first body of fastener material being joined to the first web of panel material, the second body of fastener material being joined to the second web of panel material.

7. The apparatus as set forth in claim 1 wherein the fastener material joining device comprises a fastener material seal device by which the first body of fastener material is heat sealed with the first web of panel material to be joined thereto while the second body of fastener material is heat sealed with the second web of panel material to be joined thereto, the additional joining device comprising an additional seal device by which the third body of fastener material is heat sealed with the web of side gusset material to be joined thereto.

8. The apparatus as set forth in claim 1 further comprising:
    a longitudinal seal device by which the first and second webs of panel material are heat sealed with each other longitudinally thereof after being superposed with each other again;
    a cross seal device by which the first and second webs of panel material and the web of side gusset material are heat sealed with each other widthwise of the first and second webs of panel material after the first and second webs of panel material are superposed with each other again; and
    a cutter by which the first and second webs of panel material are crosscut widthwise thereof after being heat sealed.

* * * * *